Oct. 29, 1963 W. M. PELINO 3,108,773
HOTBOX DETECTOR
Filed May 16, 1960
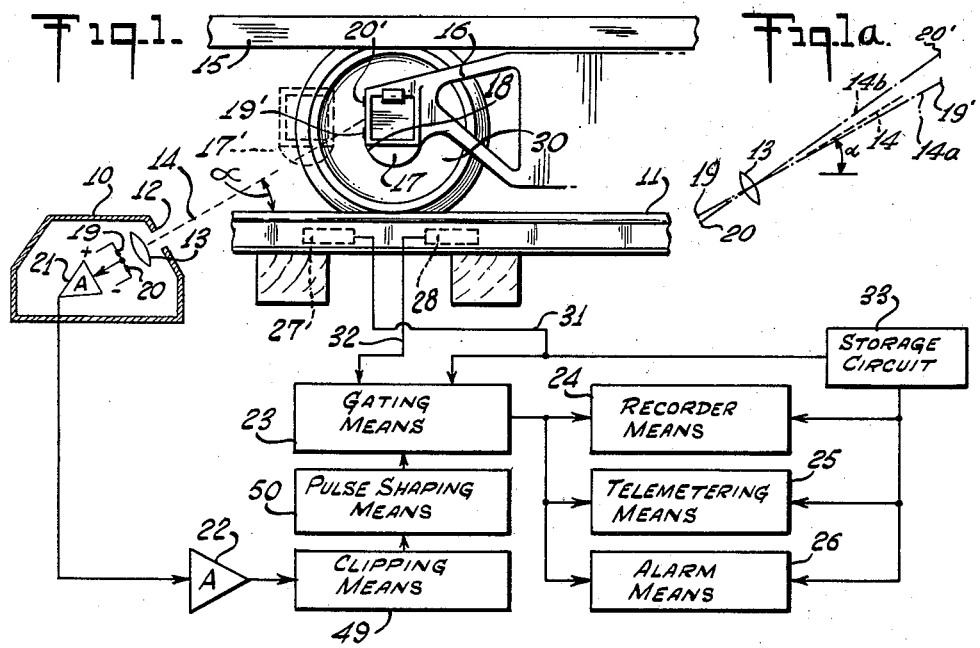
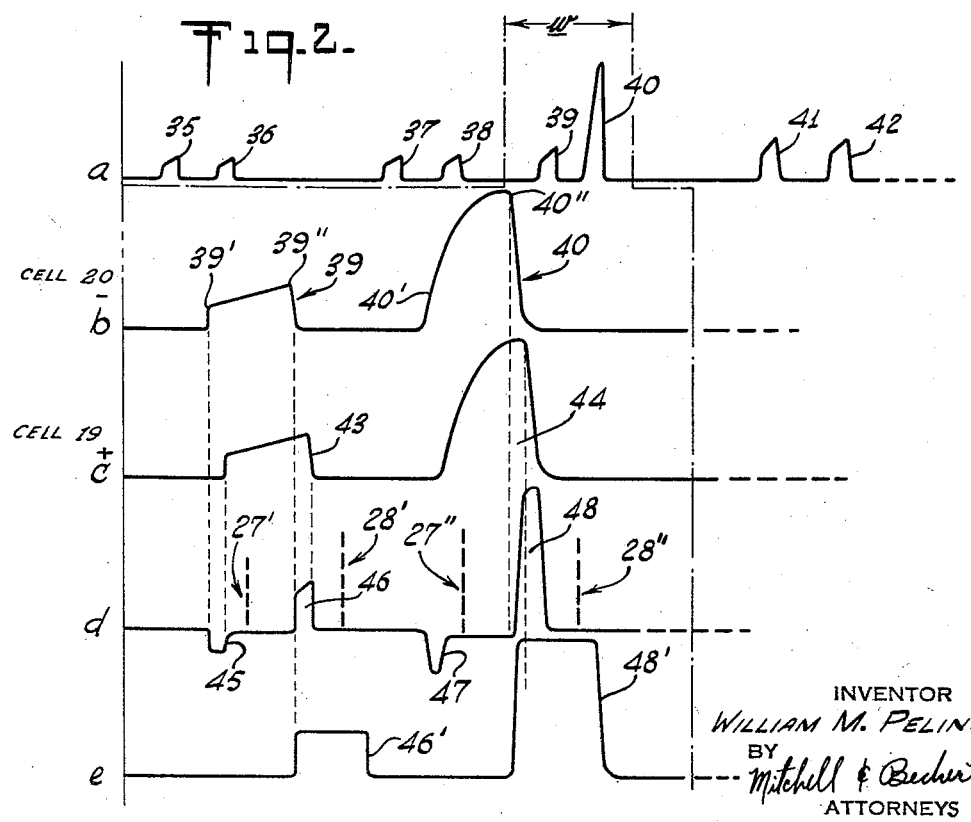
INVENTOR
WILLIAM M. PELINO
BY
Mitchell & Bechert
ATTORNEYS

United States Patent Office 3,108,773
Patented Oct. 29, 1963

3,108,773
HOTBOX DETECTOR
William M. Pelino, Garden City, N.Y., assignor to Servo Corporation of America, Hicksville, N.Y., a corporation of New York
Filed May 16, 1960, Ser. No. 29,189
6 Claims. (Cl. 246—169)

This invention relates to an infrared sensitive hotbox detecting device of the general class described in greater detail in Gallagher et al. Patent 2,880,309, issued March 31, 1959.

In hotbox detecting devices of the character indicated, an infrared sensitive means is imaged by an optical system on an upwardly inclined axis so oriented that the image of the infrared sensitive device is caused to scan corresponding sides of passing journal boxes. In most detectors used today, the aspect of scan is such that the trailing or rear side of journal boxes is inspected, so that the scan progresses from the bottom to the top of each journal box. The warmest area to be scanned is at the top of the side, and it has been the problem to observe primarily the heat radiation attributable only to that upper portion of the trailing side of the journal box. For any given scan, the output is of relatively low magnitude upon commencement of scan, and the signal magnitude builds up to a maximum at termination of scan. Various wheel-flange operated means have been proposed whereby the electrical output of the detector fed to recorder or other mechanisms may be limited essentially only to that which corresponds to the warmest part of the journal box, but because journal boxes are of various sizes and because rolling-stock wheels are also of various diameters, it has been an impossibility to utilize the wheel flange as a means for triggering the gating device to limit detector output effectively only to the desired portion of the journal box. Also, variation in train speed has further reduced the possibility of observing essentially only the desired upper part of the journal box.

It is accordingly an object of the invention to provide an improved device of the character indicated.

Another object is to provide an improved hotbox detecting device which will be primarily responsive only to the warmest viewable part of the journal box.

It is a specific object to provide a device of the character indicated responsive only to the warmest viewable part of the journal box, regardless of variations in size of journal box and in size of wheel.

Another specific object is to meet the above objects with a device which functions relatively independent of train speed.

Other objects and various further features of novelty and invention will be pointed out or will occur to those skilled in the art from a reading of the following specification in conjunction with the accompanying drawings. In said drawings:

FIG. 1 is a simplified diagram schematically indicating mechanical, electrical and optical parts of a hotbox detecting device incorporating features of the invention;

FIG. 1a is a simplified optical diagram depicting image inversion by reason of the lens of FIG. 1.

FIG. 2 is a series of simplified graphs depicting electrical signals occurring within the mechanism of FIG. 1; curve a of FIG. 2 is drawn to a first time scale, and curves b through e are drawn to an expanded time scale, represented by the interval w in FIG. 2a.

Briefly stated, my invention contemplates a particular hotbox detector of the character indicated wherein two infrared sensitive cells, rather than the usual one, are used to scan the same path on all passing journal boxes of a given side of a train, the arrangement being such that one cell is in closely spaced relation with (effectively ahead of) the other cell. The outputs of the cells are differentially evaluated, so that for each scan of a given box, a first differential pulse will identify the commencement of scan, and a second and oppositely polarized pulse will identify the termination of scan. For trailing-aspect viewing, that is, for viewing of trains progressing away from the detector, the first such pulse will reflect the difference between cell signals as the lower part of the box is first viewed, and this will be of relatively small magnitude because the lower part of the box is the coolest portion. The termination of scan will be characterized by a differential pulse of greater magnitude and opposite polarity, and this second pulse will reflect observation at the region of the trailing side of the box, which includes the uppermost portion of the box. This effective viewing of only the uppermost portion of the box will be achieved regardless of the size of the box and regardless of the size of the wheel. Various alternative mechanisms using wheel-trip devices to simplify the treatment of the differential output of the respective cells will be described.

Referring to FIG. 1 of the drawings, my invention is shown in application to a hotbox detector device comprising a scanner located within a housing 10 fixedly mounted alongside a length of railroad track 11. The housing 10 may be mounted on one of the ties supporting the track 11, or it may be mounted upon a special concrete or other footing. The housing 10 has an opening 12 through which an optical system including an infrared-transmitting lens 13 may image suitable infrared detecting means along a viewing axis 14 which is inclined upwardly at an angle $a$ with the plane of the track 11, and is aimed in the general longitudinal direction of the track 11. The arrangement is such that upon passage of a railroad car, such as the car 15, having a truck frame 16 with a journal box 17, the detecting means will scan along the side 18 of the box 17 and along corresponding sides (18) of all passing journal boxes (17).

In accordance with the invention, two infrared responsive cell elements 19—20 are arranged in the focal plane of the optical system 13, which is so focused as to image said cell elements 19—20 at areas 19'—20' which are spaced one ahead of the other on the scan line or path on the side 18 of journal box 17. For forward-aspect viewing, the car 15 will be proceeding from right to left in the sense of FIG. 1, in which case, the scan axis 14 will first intercept the upper portion of the box 17 and will complete the scan as the axis 14 leaves the lower portion of the box 17.

In FIG. 1a I illustrate with a simplified optical diagram the image inversion accomplished by lens 13, whereby the upper cell element 19 is imaged at the lower area 19' on the journal box, while the lower cell element 20 is imaged at the upper area 20' on the journal box. The separate lines of sight 14a—14b for each of these responses are separately illustrated and are symmetrically located on opposite sides of the optical axis 14 of lens 13.

In the preferred arrangement, however, trailing-aspect viewing is employed. In other words, the car 15 is proceeding from left to right in the sense of FIG. 1, and the scan axis 14 first intercepts the box 17 at the lower portion and causes the images 19'—20' to follow the same path from the bottom up to the top of the journal box 17 along the side 18. Immediately prior to and immediately after scan of the side 18, the cells 19—20 are imaged on the underside of the car frame 15, thus providing a generally quiet and uniform background level against which any heat radiated by portions of the side 18 of the box 17 may be clearly observed.

It has been explained that the outputs of the cells 19—20 are differentially evaluated. In the form shown, this is accomplished by arranging both cells 19—20 in opposite arms of the same bridge, the cell 19 being polarized with a positive bias supply, and the cell 20 being polarized with a negative bias supply. The differential output is taken from the interconnection of cells 19—20 and is fed to a preamplifier 21, and thence remotely, if desired, to suitable further amplifying means 22, gating means 23, and recording, telemetering and/or alarm means 24—25—26, as may be dictated by operational requirements of the particular installation. The gating means may be as described in said patent and, for this purpose, in FIG. 1 there are shown two wheel-trip devices 27—28 which are preferably of the permanently magnetized induction type, utilizing the flange of the car wheel 30 to change the reluctance in a polarized air gap in order to generate in lines 31—32 suitable wheel-identifying pulses for opening and closing the gate means 23.

For trailing-aspect viewing, the trip 27 will first be actuated, and in addition, I show a storage circuit 33 to accept the first and all succeeding pulses from trip 27 to develop an elongated storage or holding pulse. The storage or holding circuit may be as described in said patent and will activate the various devices 24—25—26 in order that they may accept the output of the gating means 23 for the full passage of the train, regardless of the speed of the train, the holding time constant at 33 being sufficient to take the slowest train expected for the installation.

The operation of my invention will be better understood by reference to the various curves of FIG. 2. In curve a, I illustrate the electrical signal which would be attributable to one of the cells 19—20, apart from any differential connection of said cells. This curve a is illustrative of the type of video output achieved with the system of said patent, wherein but a single cell is caused to scan passing journal boxes. For a first freight car, first and second output pulses 35—36 will be developed and passed to recording means such as a moving-strip chart recorder 24. It so happens that the pulses 35—36 reflect observation of so-called normal journals wherein nothing unusual is observed in external heat radiation. The same may be said of the last two signals 37—38 for the first freight car. Now, with the next car, the first axle develops a pulse 39 which appears to be just as normal as all the other pulses of the first car, but the second pulse 40 is of substantially elevated magnitude, which could be interpreted as being a journal box having an overheated condition which would warrant the stopping of the train. Subsequent heat pulses 41—42 for the second car are again substantially normal.

Now to examine in greater detail the normal and abnormal pulses 39—40 for the second freight car, curve b has been drawn on an expanded scale (representing the interval w of curve a), and these two pulses 39—40 have been generally indicated by arrow designations. The expanded scale of curve b permits one to note that the pulse output of a single cell (18—19) commences at 39' at a relatively low level and builds up fairly continuously to a peak at 39" before the cell image leaves the journal box and observes the underside of the car. For the second pulse 40, representing an abnormal journal condition, the scanned heat signal commences at a relatively low level at 40' and progresses to a peak at 40" just before the image of the scanning cell leaves the upper portion of the journal box. Actually, it will be understood that the heat profiles illustrated in the drawings are somewhat simplified and that a range of variations of profiles will be encountered in actual use. The only purpose of the diagram of curves b, c, d and e is to illustrate functionally the operation of the equipment of the invention.

Assuming that curve b displays the electrical output attributable to the cell 20 scanning the journal box, namely, the cell whose imaged area 20' first intercepts the journal box 17, then the second cell area 19' to be so imaged will follow the same scan path, but with a slight time delay reflecting the actual separation of cells 19—20 and the speed of the train. This situation is illustrated in curve c wherein the profiles 43—44 are displayed for the electrical output of the trailing cell 19, and it will be seen that the delay or displacement between electrical outputs is constant for any given scan.

Curve d illustrates the effect of differential combination of the electrical outputs of cells 19—20 as achieved at preamplifier 21. Thus, for the first observed journal box, pulses 39—43 are differentially combined to develop a small negative lead pulse 45 and a larger positive terminal pulse 46; for the second journal box, the pulses 40—44 are differentially combined to yield a relatively small heat pulse 47 of negative polarity and a relatively large terminal pulse 48 of positive polarity.

Because the upper portion of the journal box is the portion of greatest interest, it follows that for trailing-aspect viewing, the first pulses 45—47 identifiable at any given scan of a journal box, do not contain information of greatest value; the greatest information is in the amplitude of trailing pulses 46—48. Various means may be provided for effectively eliminating the lead pulses, and in the form shown in FIG. 1, I employ a clipping device 49 forming part of the signal-processing means connecting the heat cells 19—20 to the gating means 23. Such a clipping device may be effectively a half-wave rectifier which passes only pulses 46—48 of positive polarity to the gating means 23.

For higher speed trains, the pulses 46—48 will be of relatively short duration and may constitute a problem for the bandpass limitations of the various output devices 24—25—26. For example, the system response of the recording means may be limited to 100 cycles per second, in which case the pulses 46—48 will be of too short duration to be acceptable to the recording means, for the range of desired train speeds, i.e. up to and exceeding 70 m.p.h. If this be the case, then I propose additionally to employ pulse-shaping means 50 operative on the pulses 46—48 passed by clipping means 29 and delivered to the gating and recording means.

In curve e I show that the pulse-shaping means 50 may convert the first terminal pulse 46 into an elongated square-wave pulse 46'; and similarly convert the second terminal pulse 48 into an elongated square-wave pulse 48'. The pulses 46'—48' may be of amplitude proportioned to the amplitude of pulses 46—48 and, in effect, these pulses are merely stretched by the shaping means 50 so that they may be acceptably handled by the recording, telemetering, or alarm means 24—25—26, depending upon the nature of these devices.

In a modified form, I illustrate also in FIG. 1 that the clipping means 49 may not be necessary because if the lead wheel-trip device 27 is properly placed, its signal output may be such as to develop a wheel-identifying pulse at an instant of time subsequent to development of the first differential pulses 45—47, as the case may be. Thus, the wheel trip 27 is preferably so placed with reference to the alignment axis 14 and location of scanner 10 that the identifying pulse is developed at the instant of time designated generally 27' in curve d (for the lead journal of the second freight car), and at the instant 27" (for the case of the second journal of the second freight car). This will necessarily mean that the gating means 23 is effective to exclude the lead pulses 45—47.

In FIG. 1, I illustrate in heavy dashed outline at 17' the location of the journal box 17 at the instant when the lead wheel trip 27 develops its gate-opening impulse, being the instant of time when the viewing axis 14 is seen to intercept the lower portion of the journal box, and of course when both cells 19—20 have been assuredly imaged on said lower portion.

Now, for the case of a single wheel-trip device 27, the gating means or the wheel-trip means 27 may include provision for holding open the gating means 23 for an adequate fixed short period of time to cover development of the pulses 46—48, as the case may be; in said patent, it is disclosed that such a device may include a single stability multivibrator to provide such a fixed gate interval. However, in the preferred form shown, I utilize a second wheel trip 28 to provide a gate-closing signal effective when both cells 19—20 are again imaged on the underside of the car and after completion of journal scan. This instant is schematically indicated for the lead journal at instant 28′ in curve d, and for the second journal of truck 16 at the instant 28″. The gating means 23 will thus be seen to be open only for the period of time during which the pulses 46—48 of greatest interest will be developed, so that only these pulses are passed to the recorder means 24, to the telemetering means 25 or to the alarm means 26.

It will be seen that I have described an improved hotbox detector circuit and arrangement whereby detector response is inherently confined essentially only to the region of greatest interest on passing journal boxes—namely, the upper portion of a side. This result is achieved regardless of variations in journal size and in wheel diameter, and train speed cannot impair the ability to develop signal output for this region of interest.

While I have described the invention in detail in connection with the preferred forms shown, it will be understood that modifications may be made within the scope of the invention as defined in the claims which follow.

What is claimed is:

1. Railroad hotbox detecting means, comprising a detecting device adapted to be fixedly mounted alongside a length of railroad track, two spaced infrared sensitive detector elements having separate electrical responses to incident radiation, optical means imaging the respective sensitive areas of said detector elements, the image of one of the detector elements being spaced generally above that of the other and located generally on an axis inclined upwardly and in the general longitudinal direction of the track and aligned to scan corresponding sides of passing journal boxes, whereby for a journal box passing the field of view of said detector elements, the individual signal responses of said detector elements are identical except for a time displacement attributable to said spacing, and signal-processing means differentially responsive to the outputs of said detector elements.

2. Railroad hotbox detecting means, comprising a detecting device adapted to be fixedly mounted alongside a length of railroad track, two spaced infrared sensitive detectors having separate electrical responses to incident radiation, optical means imaging the respective sensitive areas of said detectors, the image of one of said detectors being spaced generally above that of the other and located generally on an axis inclined upwardly and in the general longitudinal direction of the track and aligned to scan corresponding trailing sides of passing journal boxes, means differentially responsive to the outputs of said detectors, whereby for each journal box scanned there will be a pulse of one polarity identified with the commencement of scan and a pulse of opposite polarity identified with the completion of scan by said detectors, and polarized clipping means connected to said last-defined means for effectively eliminating said first pulse, whereby only the pulse identified with the upper part of the trailing side of each scanned journal box is available at the output of said clipping means.

3. Railroad hotbox detecting means, comprising a detecting device adapted to be fixedly mounted alongside a length of railroad track, two spaced infrared sensitive detectors having separate electrical responses to incident radiation, optical means imaging the respective sensitive areas of said detectors, the image of one of said detectors being spaced generally above that of the other and located generally on an axis inclined upwardly and in the general longitudinal direction of the track and aligned to scan corresponding approaching sides of moving journal boxes, means differentially responsive to the outputs of said detectors, whereby for each journal box scanned there will be a pulse of one polarity identified with the commencement of scan and a pulse of opposite polarity identified with the completion of scan by said detector, and polarized clipping means connected to said last-defined means for effectively eliminating said first pulse, whereby only the pulse identified with the upper part of the front side of each scanned journal box is available at the output of said clipping means.

4. A hotbox detecting means according to claim 2, and including pulse-shaping means connected to said clipping means and effective to provide a pulse of predetermined duration for each pulse passed by said clipping means, said last-defined pulse having an amplitude substantially proportional to the pulse amplitude at the output of said clipping means.

5. Railroad hotbox detecting means, comprising a detecting device adapted to be fixedly mounted alongside a length of railroad track, two spaced infrared sensitive detectors having separate electrical responses to incident radiation, optical means simultaneously imaging the respective sensitive areas of said detectors on each passing journal box, the image of one of said detectors being spaced generally above that of the other and generally on an axis inclined upwardly and in the general longitudinal direction of the track and aligned to scan trailing sides of passing journal boxes, whereby the individual signal responses of said detectors are identical except for a time displacement attributable to said spacing, means differentially responsive to the outputs of said detectors, wheel-responsive identifying means fixed with respect to the track and so located with respect to said journal box as to produce a wheel-identifying pulse after commencement of journal-box scan but before completion of journal-box scan by both said detectors, and gating means connected to the output of said differentially responsive means and including a control connection from said wheel-responsive means, said connection being such that said gating means is effectively closed in the interval prior to actuation by said wheel-responsive means and is thereafter open for a gating interval including subsequent scan of said journal box by said detectors, whereby the coaction of said wheel-responsive means and said gating means is effective to eliminate, for trailing-aspect viewing, the first pulse developed by said differentially responsive means for a given wheel and to pass only the second pulse developed by said differentially responsive means.

6. A device according to claim 5, in which a second wheel-responsive device is spaced longitudinally along the track and operated by the same wheel and is so located that upon actuation of said second wheel-responsive device both detectors have completed their scans of the journal box for the said wheel, said second wheel-trip device being in gate-closing relation with said gating means.

References Cited in the file of this patent

UNITED STATES PATENTS 2,710,559    Heitmuller et al. _____ June 14, 1955
2,800,023    Obermaier _____ July 23, 1957
3,031,576    Loy _____ Apr. 24, 1962

OTHER REFERENCES

S.H.A. German application 1,031,338, printed June 4, 1958 (Kl. 20 h 1).